US007284785B2

(12) United States Patent
Gotou et al.

(10) Patent No.: US 7,284,785 B2
(45) Date of Patent: Oct. 23, 2007

(54) HARNESS ROUTING STRUCTURE

(75) Inventors: Jouji Gotou, Utsunomiya (JP);
Masatoshi Adachi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 11/432,892

(22) Filed: May 12, 2006

(65) Prior Publication Data
US 2006/0267380 A1 Nov. 30, 2006

(30) Foreign Application Priority Data
May 24, 2005 (JP) ............................. 2005-151372

(51) Int. Cl.
B60J 5/06 (2006.01)
(52) U.S. Cl. ..................... 296/155; 174/72 A
(58) Field of Classification Search ................ 296/155; 49/360, 120; 174/72 A, 135, 72 C, 69
See application file for complete search history.

(56) References Cited
U.S. PATENT DOCUMENTS

| 4,470,622 | A | * | 9/1984 | Pate et al. .................. 285/419 |
| 5,279,507 | A | * | 1/1994 | Kameyama .................. 439/552 |
| 6,492,592 | B1 | * | 12/2002 | Murofushi et al. ....... 174/72 A |
| 6,566,603 | B2 | * | 5/2003 | Doshita et al. ........... 174/72 A |
| 6,787,702 | B2 | * | 9/2004 | Suzuki ..................... 174/72 A |
| 6,793,259 | B2 | * | 9/2004 | Sano et al. ................. 296/155 |
| 6,830,225 | B2 | * | 12/2004 | Kato ............................ 248/49 |
| 6,996,967 | B2 | * | 2/2006 | Kobayashi .................. 59/78.1 |
| 7,053,306 | B2 | * | 5/2006 | Tsubaki et al. ........... 174/72 A |
| 7,082,720 | B2 | * | 8/2006 | Kobayashi et al. ........... 49/360 |
| 2006/0056165 | A1 | * | 3/2006 | Tsunoda et al. ............ 361/826 |
| 2006/0170244 | A1 | * | 8/2006 | Blase .......................... 296/155 |
| 2006/0254800 | A1 | * | 11/2006 | Itou et al. .................... 174/100 |

FOREIGN PATENT DOCUMENTS

| JP | 2001-354085 | 12/2001 |
| JP | 2003-025850 | 1/2003 |
| JP | 2004-025999 | 1/2004 |

* cited by examiner

Primary Examiner—Kiran B. Patel
(74) Attorney, Agent, or Firm—Carrier, Blackman & Associates, P.C.; Joseph P. Carrier; William D. Blackman

(57) ABSTRACT

A harness routing structure for a sliding door includes harnesses that are routed between a vehicle body and a sliding door, and a guiding device that is provided along the harnesses and that guides the harnesses, wherein the guiding device has at the ends thereof installation portions that are respectively installed on the vehicle body and the sliding door, and a torsion-permitting portion for permitting twisting of the harnesses is provided along the harnesses in the installation portions.

4 Claims, 15 Drawing Sheets

FRONT ← → REAR

FRONT ←→ REAR

US 7,284,785 B2

HARNESS ROUTING STRUCTURE

BACKGROUND OF THE INVENTION

1. Field of the Invention

The present invention relates to a harness routing structure that is used, for example, between a sliding door and a vehicle body of a vehicle such as an automobile or the like.

Priority is claimed on Japanese Patent Application No. 2005-151372, filed May 24, 2005, the content of which is incorporated herein by reference.

2. Description of Related Art

In some vehicles equipped with a sliding door, the sliding door can be opened and closed by using electric power. In such a sliding door, harnesses for a power supply and sensors must be routed between the vehicle body and the sliding door. When routing the harnesses, the harnesses are protected by providing a harness guide that retains the harnesses. The harness guide is provided because the profile of the harnesses, or specifically, the routing configuration, changes as the sliding door is opened and closed (refer, for example, to Japanese Unexamined Patent Application, First Publication No. 2004-25999).

In the conventional technology described above, a harness guide is used that provides flexibility by linking a plurality of freely rotating pieces so that the routing configuration of the harnesses that follow the movable sliding door does not become needlessly deformed. However, because the curvature direction and the installation angle of the harness guide are restricted due to the ends of the harness guide being attached respectively to the sliding door and the vehicle body, there are problems in that it is necessary to secure by an equivalent amount a large routing area for the harness guide, in particular in the outward transverse direction of the vehicle, and in that the layout for the harness routing becomes difficult.

SUMMARY OF THE INVENTION

Thus, an object of the present invention is to provide a routing structure for harnesses in which the layout of the harness routing becomes simple.

In order to attain the object described above, the invention is a harness routing structure for a sliding door having harnesses that are routed between a vehicle body and a sliding door, and a guiding device that is provided along the harnesses and that guides the harnesses, wherein the guiding device has at the ends thereof installation portions that are respectively installed on the vehicle body and the sliding door, and a torsion-permitting portion for permitting the twisting of the harnesses is provided along the harnesses in the installation portions.

In the harness routing structure described above, the guiding device may have at one end a first installation portion installed on the vehicle body and may have at the other end a second installation portion installed on the sliding door.

In the harness routing structure described above, the torsion-permitting portion may be formed in the vertical direction.

In the harness routing structure, the torsion-permitting portion may be formed by dies in such a manner that an extraction direction of the dies is set along the harnesses.

According to the invention, due to the torsion-permitting portions for the harnesses that are provided in the installation portions at the end portions of the guiding device, the rotation of the end portions of the guiding device can be permitted, the degree of freedom of the routing configuration of the harnesses and the guiding device is increased, and thereby space-saving can be realized.

According to the invention, due to the torsion-permitting portion provided in both end portions of the guiding device, it is possible to increase the degree of freedom of the routing configuration of the harnesses along the entire guiding device.

According to the invention, the rotation of the end portions of the guiding device due to the movement of the sliding door in the horizontal direction can be converted into a twisting action with high efficiency.

According to the invention, it is possible to prevent damage to the harnesses because the occurrence of burrs in the direction that intersects the direction along the harnesses can be avoided during molding, and therefore, it is possible to improve the durability of the harnesses.

BRIEF DESCRIPTION OF THE DRAWINGS

FIG. 19A is a view along arrow E in FIG. 2 and FIG. 19B is a view along arrow F in FIG. 2.

FIG. 20A is a view along arrow E in FIG. 2 and FIG. 20B is a view along arrow G in FIG. 20A.

FIG. 21A is a view along arrow E in FIG. 2 and FIG. 21B is a view along arrow H in FIG. 21A.

DETAILED DESCRIPTION OF THE INVENTION

Next, an embodiment of the present invention will be explained with reference to the figures.

Figure 1:
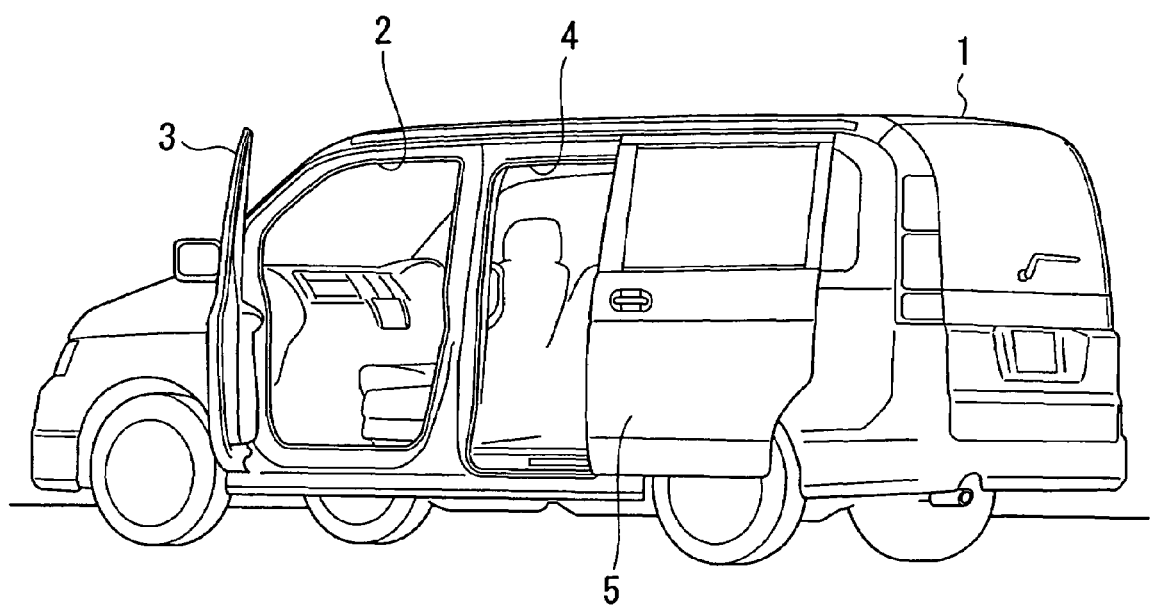
FIG. 1 is a perspective view of the vehicle in an embodiment of the present invention.

A so-called mini-van type vehicle is shown in FIG. 1. On the vehicle body 1 of this vehicle, front side doors 3 are supported as to be able to open and close in the front door installation opening portions 2 that are formed on both sides by the front seats. In addition, behind the front side door 3 on the passenger side, a sliding door 5 is provided in the back door installation opening portion 4 so as to be able to open and close in the longitudinal direction. This sliding door 5 is supported so as to slide freely on the vehicle body 1 by arms provided on the top portion, the center portion, and the bottom portion thereof, and the sliding door 5 is automatically opened and closed by a drive unit (not illustrated).

Figure 2:
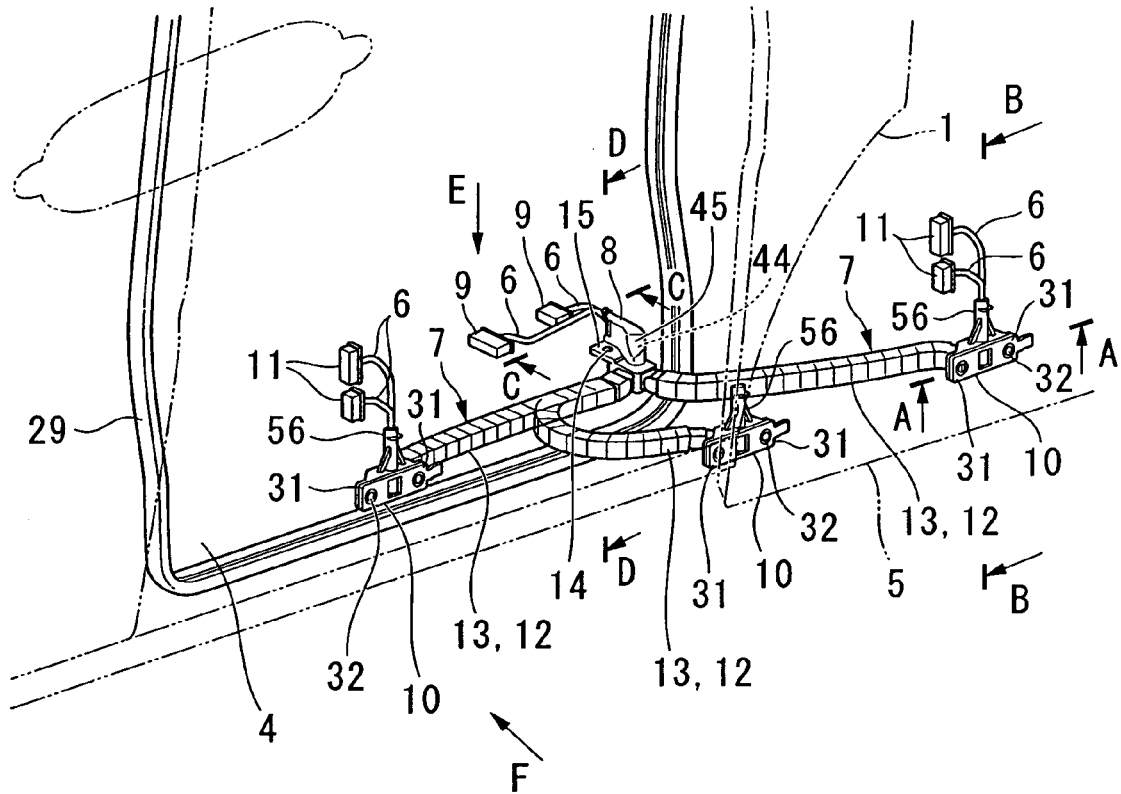
FIG. 2 is a perspective view of the guiding device of an embodiment of the present invention.
Figure 3:
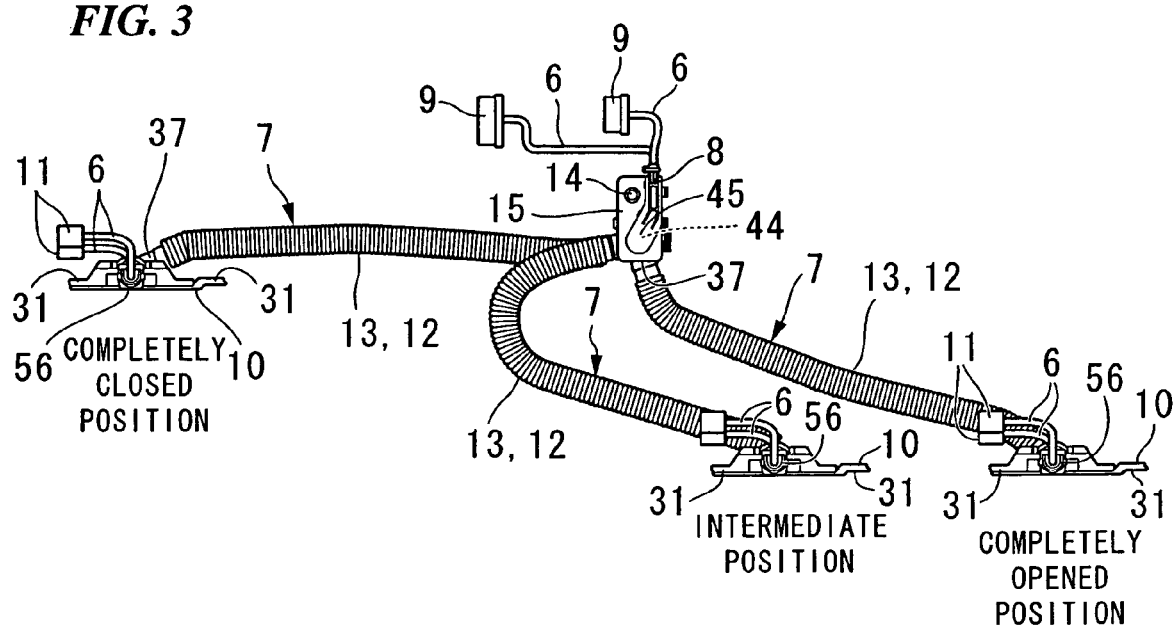
FIG. 3 is a plane view of the guiding device of an embodiment of the present invention.

As shown in FIG. 2 and FIG. 3, between the sliding door 5 and the vehicle body 1, an electricity supply harness for the drive unit for opening and closing the sliding door and a pinch sensor harness for detecting pinching during the opening of the sliding door 5 are routed through a guiding device 7 that guides these harnesses 6.

The guiding device 7 protects the harnesses 6, whose profile changes between the completely closed position, the intermediate position, and the completely opened position of the sliding door 5. Note that in FIG. 2 and FIG. 3, the guiding device 7, which changes profile depending on the position of the sliding door 5, is shown by the solid lines.

One end of the guiding device 7 provides a first installation portion 8 that is installed on the vehicle body 1, and connector portions 9 of the harnesses 6 extend from this first installation portion 8. The connector portions 9 are connected to an ECU on the vehicle body side.

The other end of the guiding device 7 provides a second installation portion 10 that is installed on the sliding door 5, and connector portions 11 of the harnesses 6 extend from this second installation portion 10. The connector portions 11 are connected to the drive unit and the sensor body on the sliding door 5 side. Between the first installation portion 8 and the second installation portion 10, a harness guide 12 that connects the first installation portion 8 and the second installation portion 10 is provided so as to enclose the harnesses 6 that connect the two connector portions 9 and 11. Because the harness guide 12 is provided so as to be able to flex over a horizontal plane mainly by connecting a plurality of pieces so as to rotate freely, a dust-proof boot 13 is provided around this harness guide 12 (refer to FIG. 8).

Figure 4:
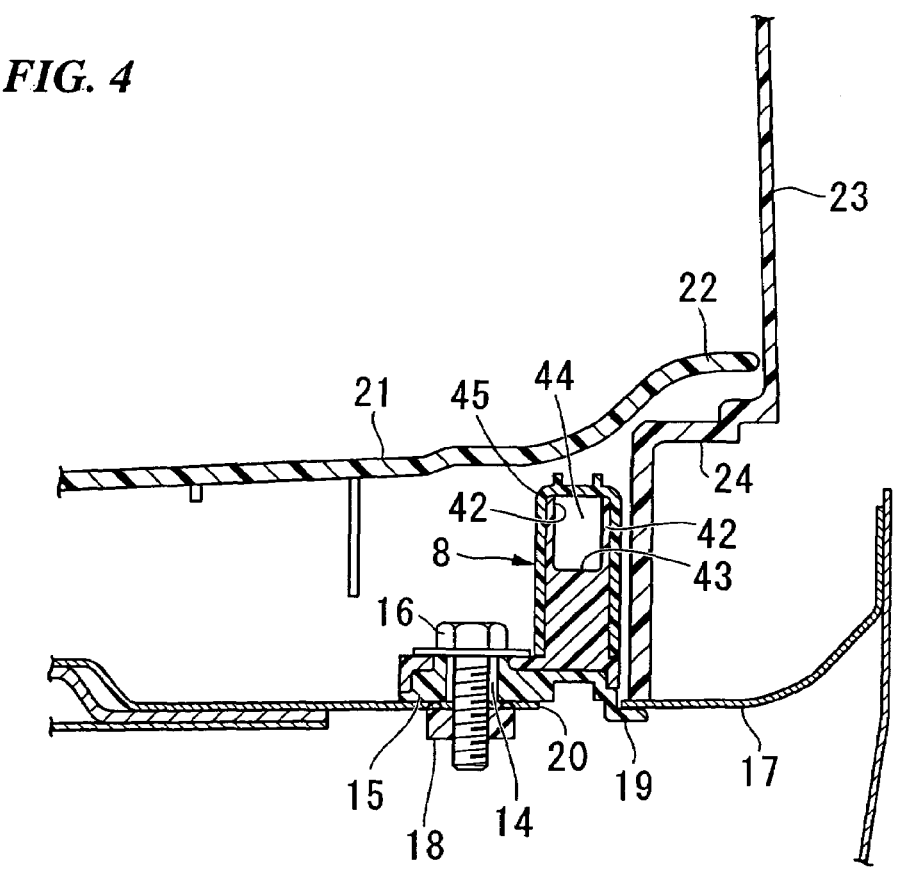
FIG. 4 is an enlarged cross-sectional view taken along the line C-C in FIG. 2.
Figure 5:
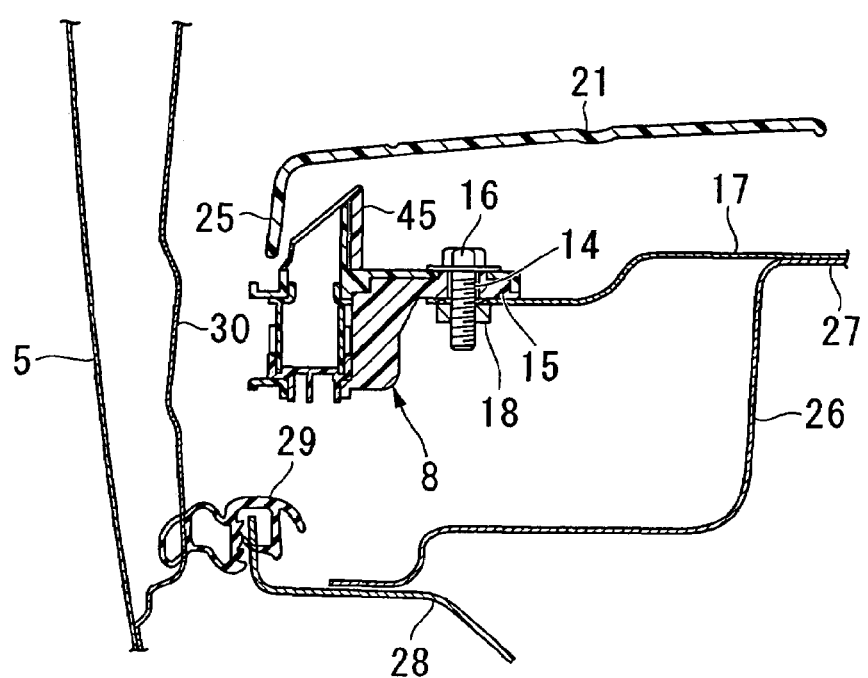
FIG. 5 is a cross-sectional view taken along the line D-D in FIG. 2.

FIG. 4 is an enlarged cross-sectional view taken along the line C-C in FIG. 2, and FIG. 5 is a cross-sectional view taken along the line D-D in FIG. 2.

As shown in FIG. 4 and FIG. 5, on the first installation portion 8 installed on the vehicle body 1, an installation piece 15 that provides one bolt hole 14 is formed so as to extend towards the inside of the passenger compartment and face the installation surface vertically. A bolt 16 that has been inserted into the bolt hole 14 is clamped by a weld nut 18 that is mounted at the under surface of the floor panel 17, and thereby the first installation portion 8 is installed on the floor panel 17. A positioning engaging portion 19 is provided on the first installation portion 8 facing towards the back, and a positioning hole 20 that is engaged by this engaging portion 19 is formed in the floor panel 17.

Above the top of the floor panel 17, a step garnish 21 is installed, and the back end 22 of the step garnish 21 is supported by a stepped portion 24 of the rear side lining 23. In addition, the end 25 of the step garnish 21 that is outside the passenger compartment bends downward and covers the top of the first installation portion 8 from outside the passenger compartment. As shown in FIG. 5, the flange portion 27 of the side sill inner upper 26 that is inside the passenger compartment is joined to the underside of the floor panel 17 and the side sill lower 28 is joined to the end of the side sill inner upper 26 that is outside the passenger compartment. An inner panel 30 of the sliding door 5 is in proximity to the vehicle body side seal 29 provided on the flange portion of the side sill lower 28.

Therefore, the first installation portion 8 is disposed inside the end 25 of the vehicle in the transverse direction. The end 25 of the step garnish 21 is outside the passenger compartment, and the step garnish 21 is in proximity to the sliding door 5.

Figure 6:
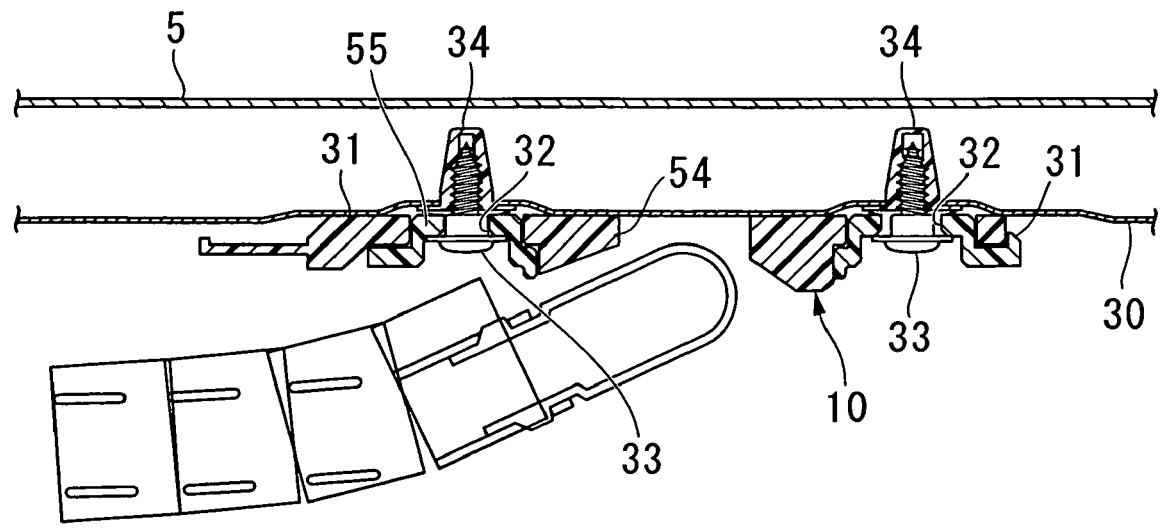
FIG. 6 is an enlarged cross-sectional view taken along the line A-A in FIG. 2.
Figure 7:
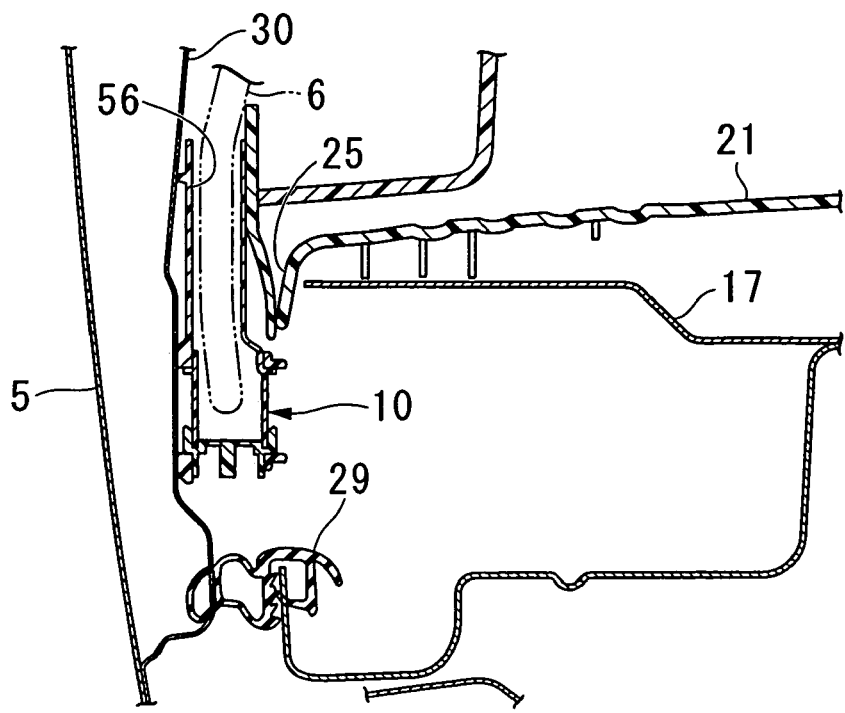
FIG. 7 is a cross-sectional view taken along the line B-B in FIG. 2.

FIG. 6 is an enlarged cross-sectional view taken along the line A-A in FIG. 2, and FIG. 7 is a cross-sectional view taken along the line B-B in FIG. 2. As shown in FIG. 6 and FIG. 7, two installation pieces 31 are formed on the second installation portion 10, which is installed on the sliding door 5, and arranged in a longitudinal direction and facing the installation surface outside the passenger compartment. A loose hole 32 is formed in each of the installation pieces 31. A bis 33 that is inserted into the loose hole 32 is clamped by a clip nut 34 disposed on the under surface of the inner panel 30 of the sliding door 5, and thereby the second installation portion 10 is installed on the sliding door 5.

Here, as shown in FIG. 7, the second installation portion 10, which is installed on the inner panel 30 of the sliding door 5, is positioned between the end 25 of the step garnish 21 outside the passenger compartment and the inner panel 30 of the sliding door 5.

As shown in FIG. 8 to FIG. 12, the first installation portion 8 is a resin part and is manufactured by dies (not illustrated). The first installation portion 8 is structured such that a rotating end 37 that rotates freely in the horizontal direction (from the opened position to the closed position) is interposed between an upper bracket 35 and a lower bracket 36. Note that in FIG. 9 and FIG. 10, the opened position and the closed position of the rotating end 37 are both shown by solid lines. The rotating end 37 is a hollow member having a structure that is partitioned horizontally into an upper member 38 and a lower member 39. A through hole 40 is formed in the upper member 38 at a location positioned on the axis of rotation of the rotating end 37, and a through hole 41 is also formed on the companion upper bracket 35. The end portion of the rotating end 37 on the rotating side is open, and the harnesses 6 that have been inserted into the upper bracket 35 and the upper member 38 of the rotating end 37 are drawn from the open end thereof.

Figure 12:
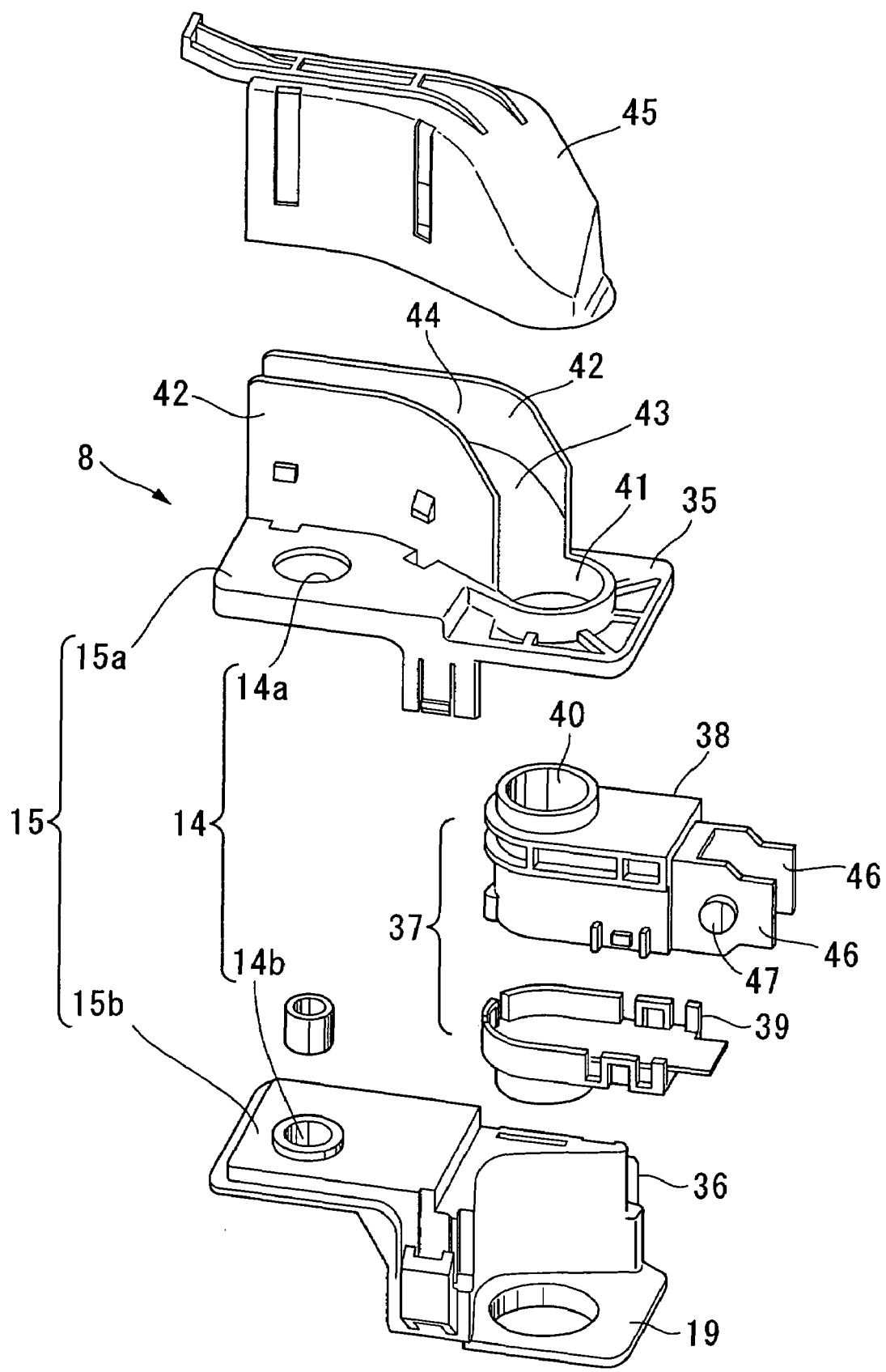
FIG. 12 is an exploded perspective view of FIG. 9.
Figure 13:
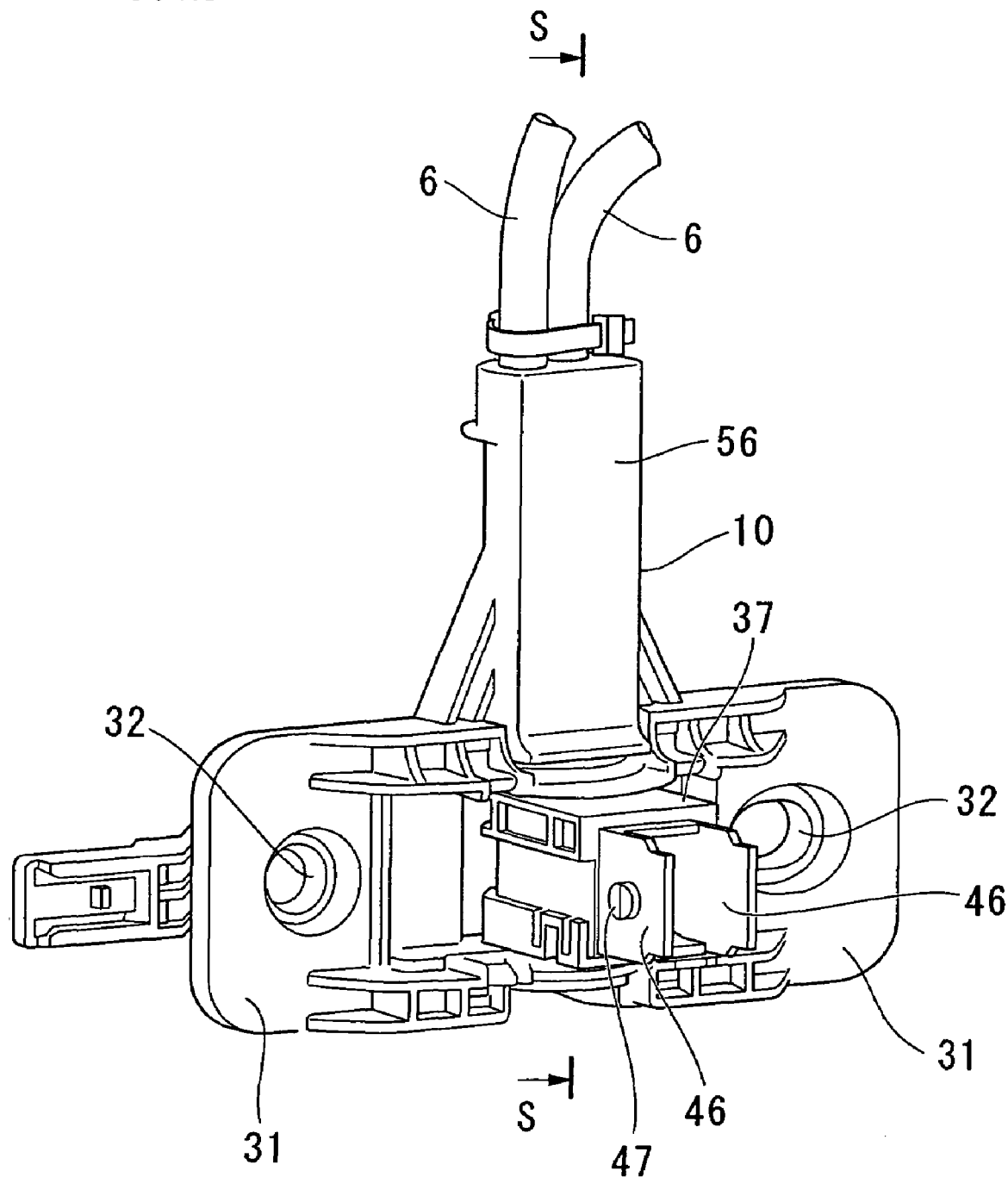
FIG. 13 is a perspective view showing the second installation portion of the embodiment of the present invention.
Figure 14:
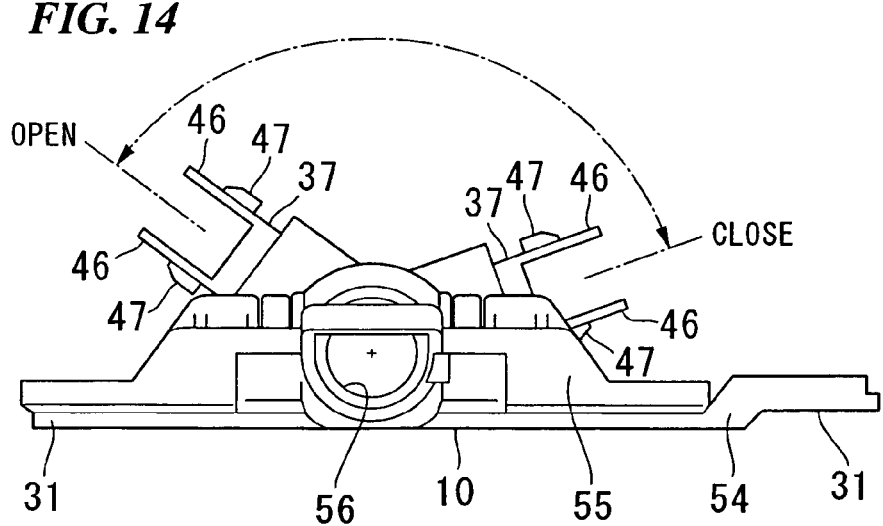
FIG. 14 is a plane view of FIG. 13.
Figure 15:
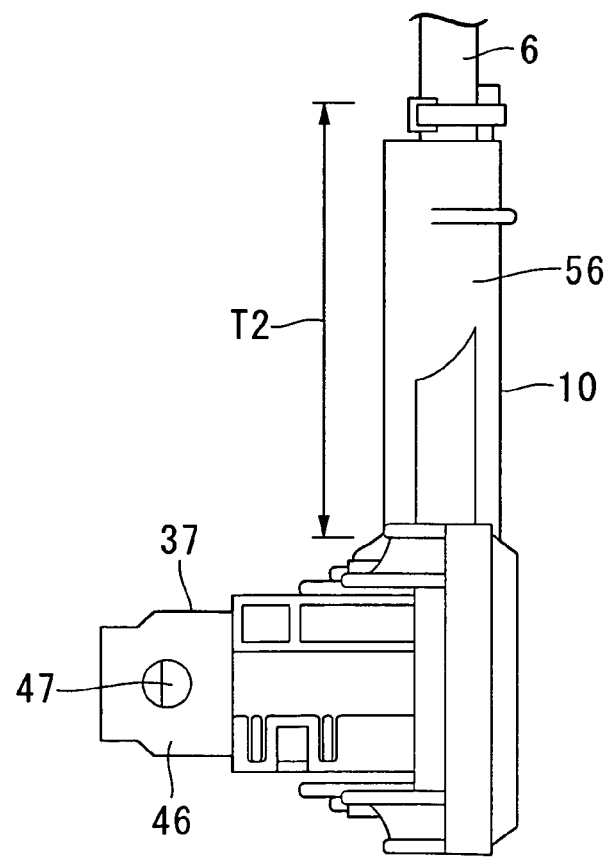
FIG. 15 is a side view of FIG. 13.
Figure 16:
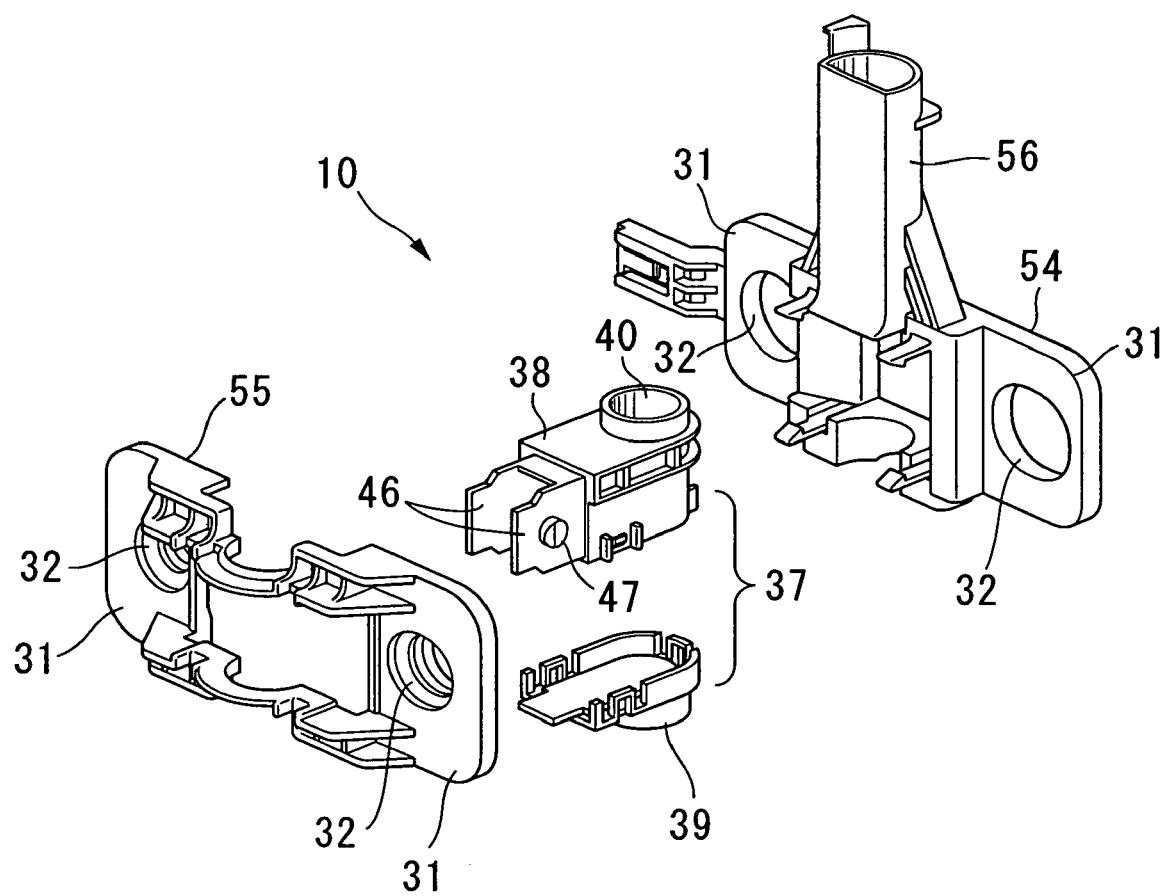
FIG. 16 is an exploded perspective view of FIG. 13.

A pair of guiding walls 42 are formed on the upper bracket 35 at positions that surround the through hole 41, and an inclined wall 43 that forms the bottom wall between these guide walls 42 is formed gently curving in an upward inclined direction up to the end portion of the insertion piece 15. The harnesses 6 that have been drawn upward from the through hole 41 are laid along an upward incline along the inclined wall 43, and lastly guided to a horizontal direction. A part that guides the harnesses 6 along an upward incline without hindering the motion due to the twisting of the harnesses 6 by the guide walls 43 and the inclined wall 43 serves as a torsion-permitting portion 44 (having a torsion range T1, for example, of about 50 mm) for the harnesses 6. A bolt hole, which is constituted by two portions 14a and 14b as shown in FIG. 12, is formed in proximity to the guiding walls 42 of the installation piece 15. The installation piece 15 is formed by a portion 15*a* of the upper bracket 35 and a portion 15*b* of the lower bracket 36, as shown in FIG. 12.

Figure 17:
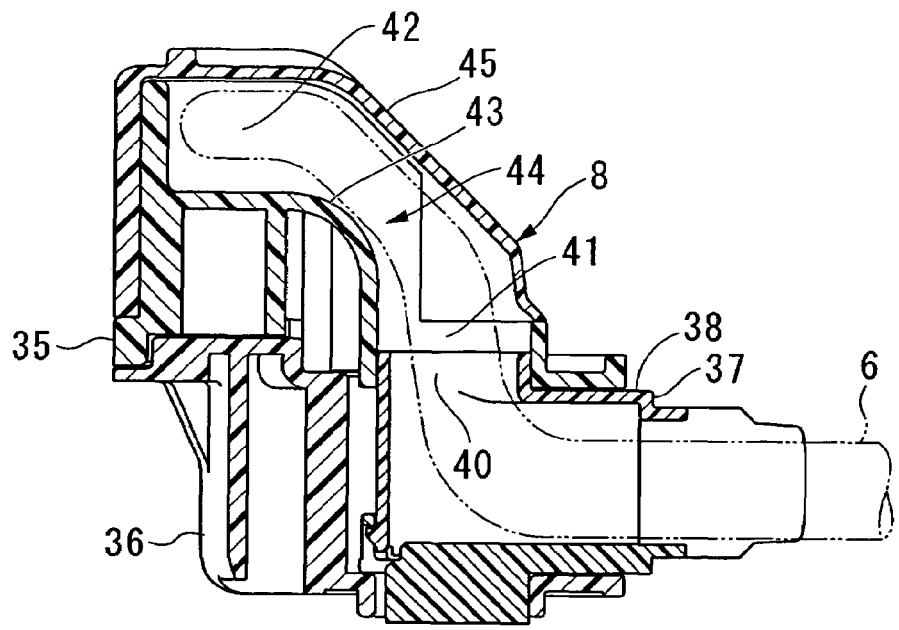
FIG. 17 is a cross-sectional view taken along the line R-R in FIG. 9.

Therefore, as shown in FIG. 17, the harnesses 6 that are connected to connector portions 9 on the vehicle body 1 side are inserted into each of the through holes 40 and 41 of the upper bracket 35 and the upper member 38 of the rotating end 37 through the torsion-permitting portion 44, and are drawn from the open end of the rotating end 37. In addition, a cap 45 that covers the upper bracket 35 from the outside is installed on the guide walls 42 of the upper bracket 35.

Figure 8:
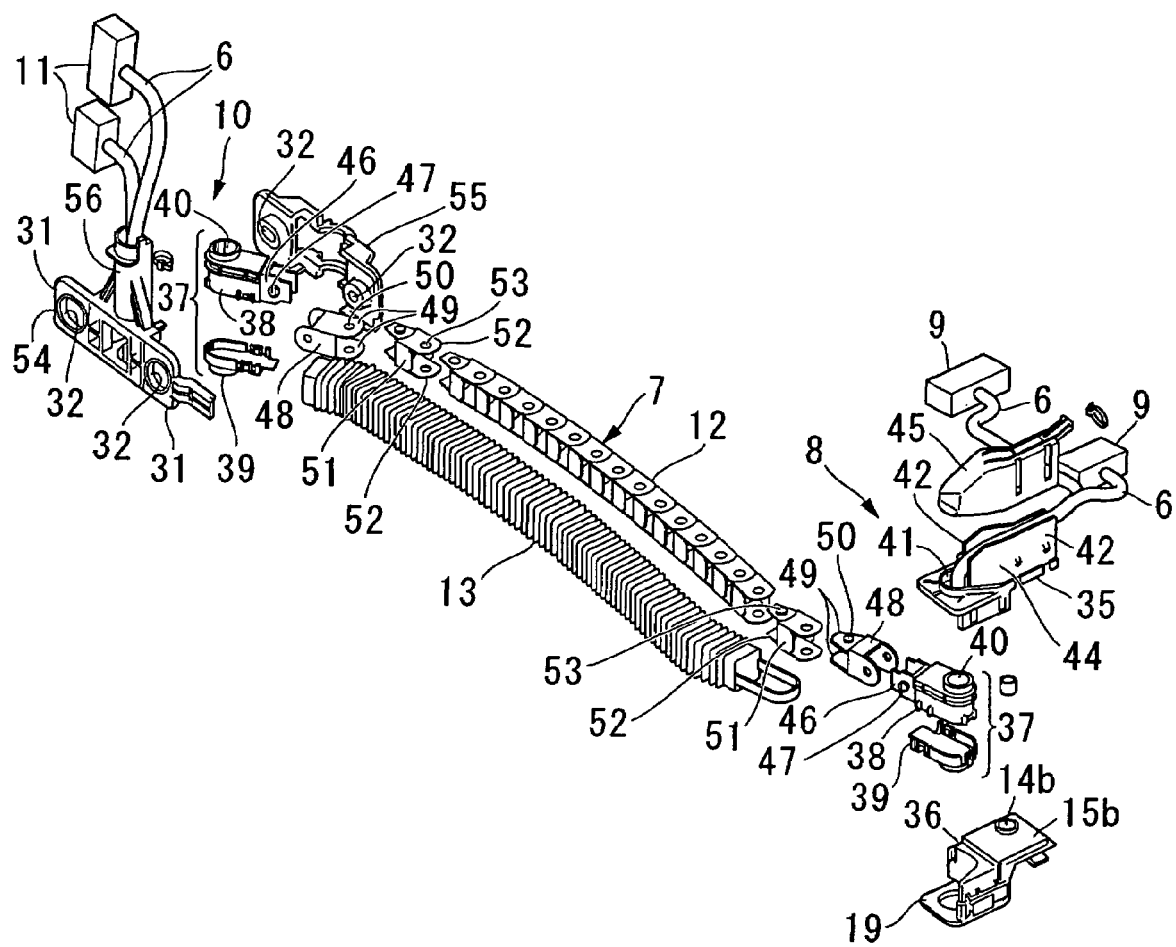
FIG. 8 is an exploded perspective view of the guiding device of an embodiment of the present invention.
Figure 9:
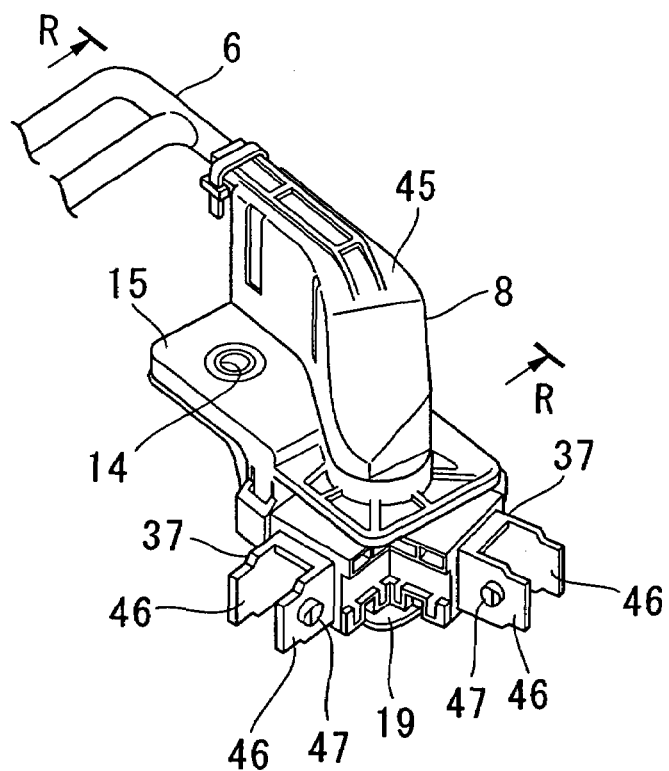
FIG. 9 is a perspective view of the first installation portion of an embodiment of the present invention.
Figure 10:
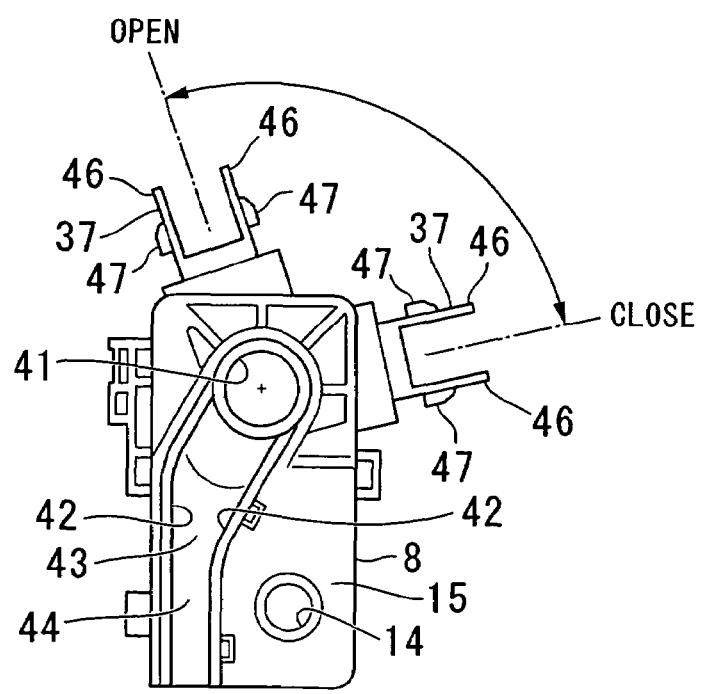
FIG. 10 is a plane view in which the cap in FIG. 9 has been removed.
Figure 11:
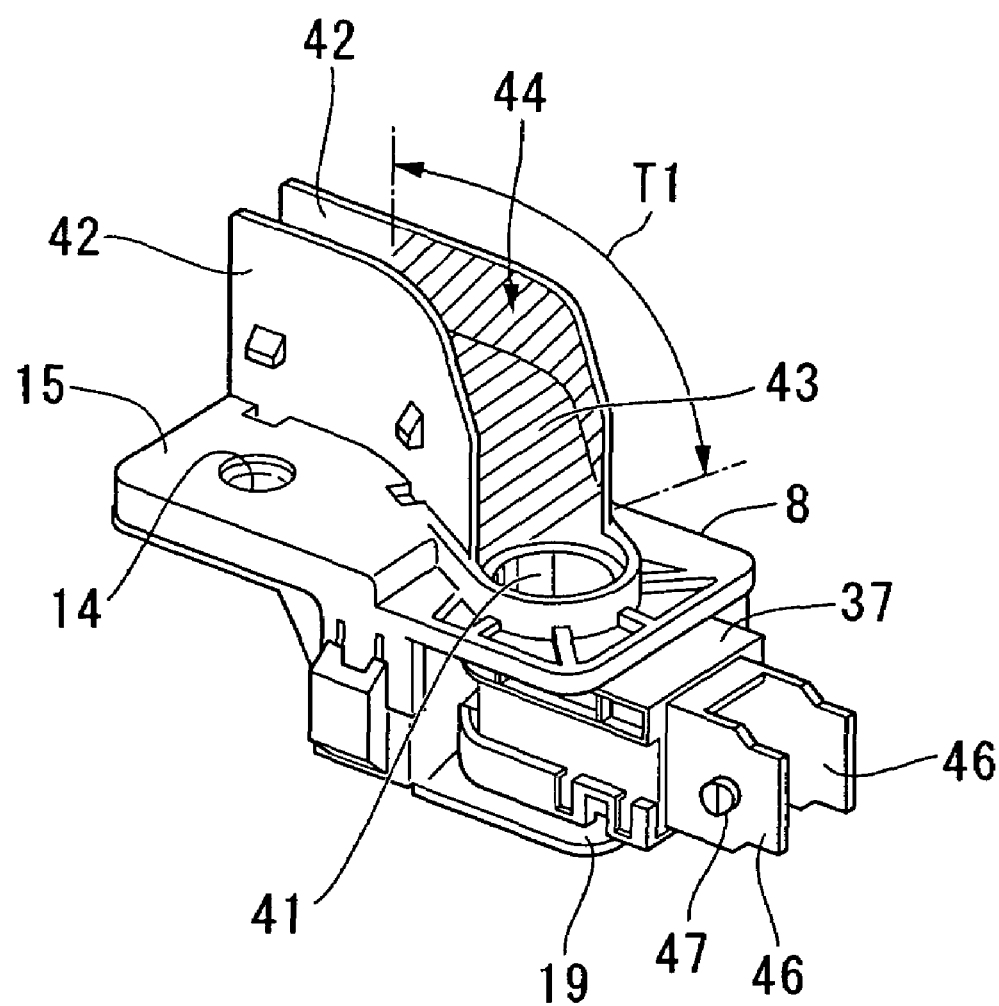
FIG. 11 is a perspective view in which the cap in FIG. 9 has been removed.

In addition, as shown in FIG. 8, engaging pieces 46 are formed on both sides of the end portion of the rotating end 37, and a first joint 48 is connected by pins 47 formed on each of the engaging pieces 46. Connecting pieces 49 are provided vertically on the end of this first joint 48, the proximal portion of a second joint 51 is connected to pins 50 formed in these connecting pieces 49, pins 53 are formed on the connecting pieces 52 provided on the top and bottom of the end portion of the second joint 51, and thereby the ends of the harness guide 12 are supported by the pins 53 so as to be able to rotate in the horizontal direction.

Here, the torsion-permitting portion 44, including the through hole 41, is removed from dies in the vertical direction, and abuts the harnesses 6. The torsion-permitting portion 44 consists of the inner surface that is enclosed by the guide walls 42 and the inclining wall 43 of the upper bracket 35. In addition, because the rotating end 37 is partitioned into two parts, i.e., the upper member 38 and the lower member 39, burrs and parting lines are not formed around the through hole 40. Thereby, when twisting occurs in the harnesses 6, the upper bracket 35 and the rotating end 37 do not damage the harnesses 6.

In contrast, as shown in FIG. 8 and FIG. 13 to FIG. 16, the second installation portion 10 is made of resin and manufactured in dies (not illustrated). The second installation portion 10 is structured such that the rotating end 37 having a configuration identical to that of the first installation portion 8 is interposed between an outer bracket 54 on the sliding door 5 side and an inner bracket 55 facing inside the passenger compartment so as to be able to rotate freely in the horizontal direction (from the opened position to the closed position). Note that in FIG. 14, the opened position and the closed position of the rotating end 37 are both shown by solid lines. The rotating end 37 is a hollow member having a structure that, like the first installation portion 8, is horizontally partitioned into an upper member 38 and a lower member 39. A through hole 40 is formed in the upper member 38 at a part positioned on the axis of rotation of the rotating end 37, and a cylindrical torsion-permitting portion 56 (having a torsion range T2, for example, of about 60 mm) is integrally formed on the companion outer bracket 54 in the vertical direction.

The end of the rotating end 37 on the rotating side is open, and the harnesses 6 that have been inserted into the torsion-permitting portion 56 of the outer bracket 54 and the upper member 38 of the rotating end 37 are drawn from this open end. The parts of outer bracket 54 and the inner bracket 55 that extend in the longitudinal direction form the installation piece 31, and a loose hole 32 is formed in this installation piece 31.

The torsion-permitting portion 56 is a cylindrical shaped part, and guides upward the harnesses 6, which have been drawn upward from the through hole 40 of the upper member 38 of the rotating end 37.

Figure 18:
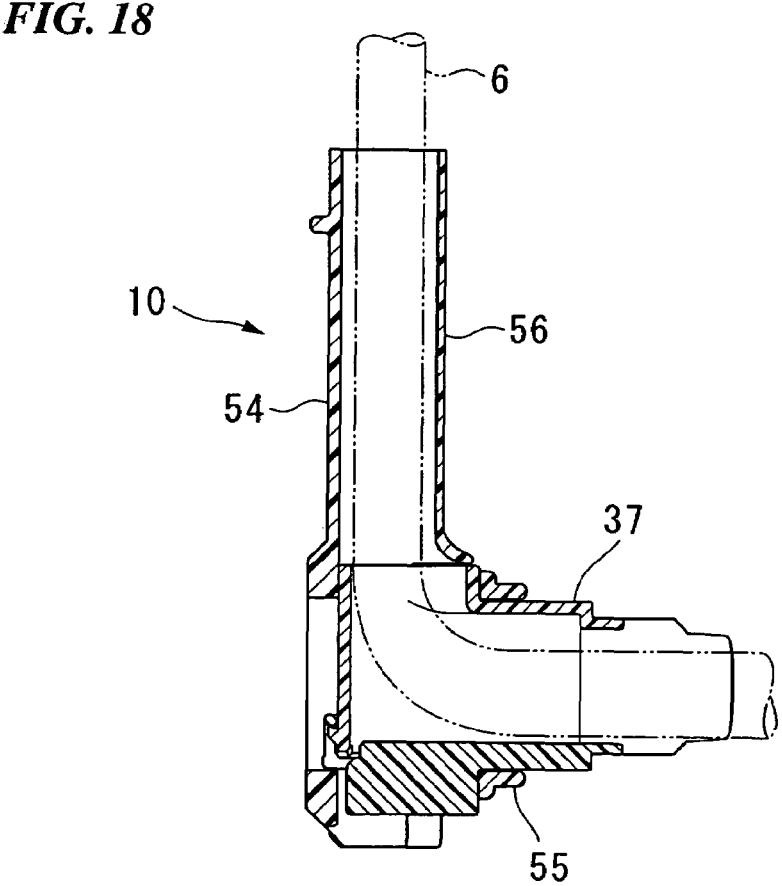
FIG. 18 is a cross-sectional view taken along the line S-S in FIG. 13.

Therefore, as shown in FIG. 18, the harnesses 6 that are connected to the connector portion 11 on the sliding door 5 side are inserted into the torsion-permitting portion 56 and the through hole 40 of the upper member 38 through the torsion-permitting portion 56, and drawn from the open end of the rotating end 37.

In addition, as shown in FIG. 8, on the end portion of the rotating end 37, the end portion of the harness guide 12 is supported so as to be able to rotate in the horizontal direction by a first joint 48 and a second joint 51, which have structures identical to those described above.

Here, the cylindrical torsion-permitting portion 56 of the outer bracket 54 is removed from the dies in the vertical direction, and abuts the harnesses 6. In addition, because the rotating end 37 is partitioned into two parts, i.e., the upper member 38 and the lower member 39, burrs and parting lines are not formed around the through hole 40. Thereby, when the harnesses 6 are twisted, the outer bracket 54 and the rotating end 37 do not damage the harnesses 6.

Next, the operation will be explained.

Figure 19A:
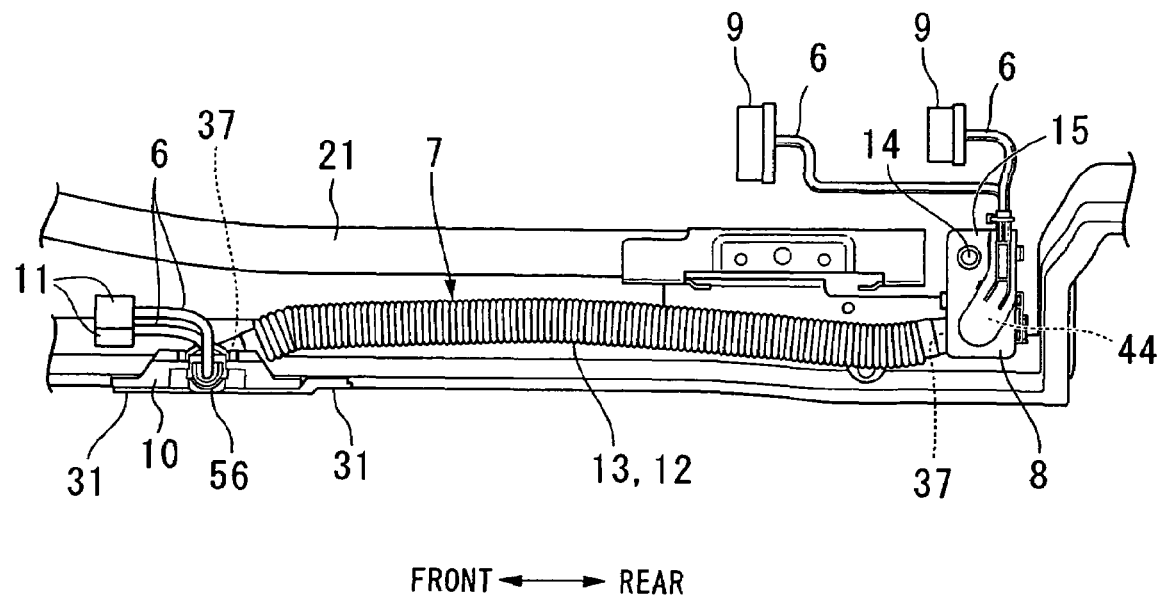
FIG. 19A and FIG. 19B show the sliding door of the embodiment of the present invention at the completely closed position, where
Figure 19B:
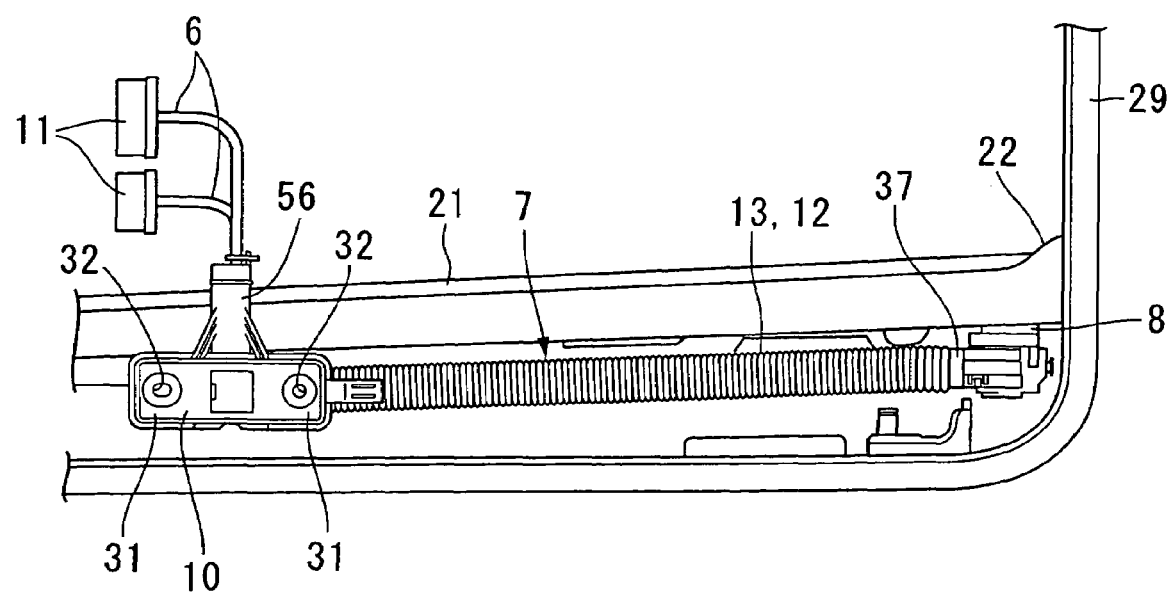
Figure 20A:
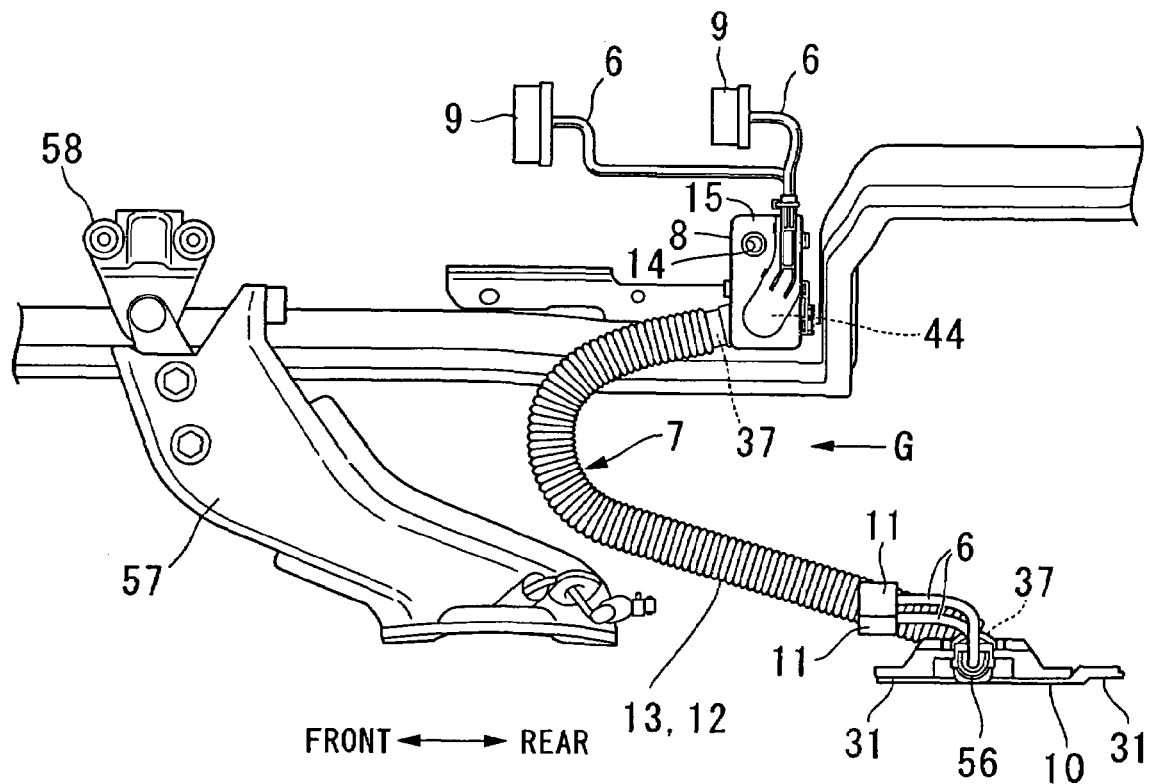
FIG. 20A and FIG. 20B show the sliding door of the embodiment of the present invention at an intermediate position; where
Figure 20B:
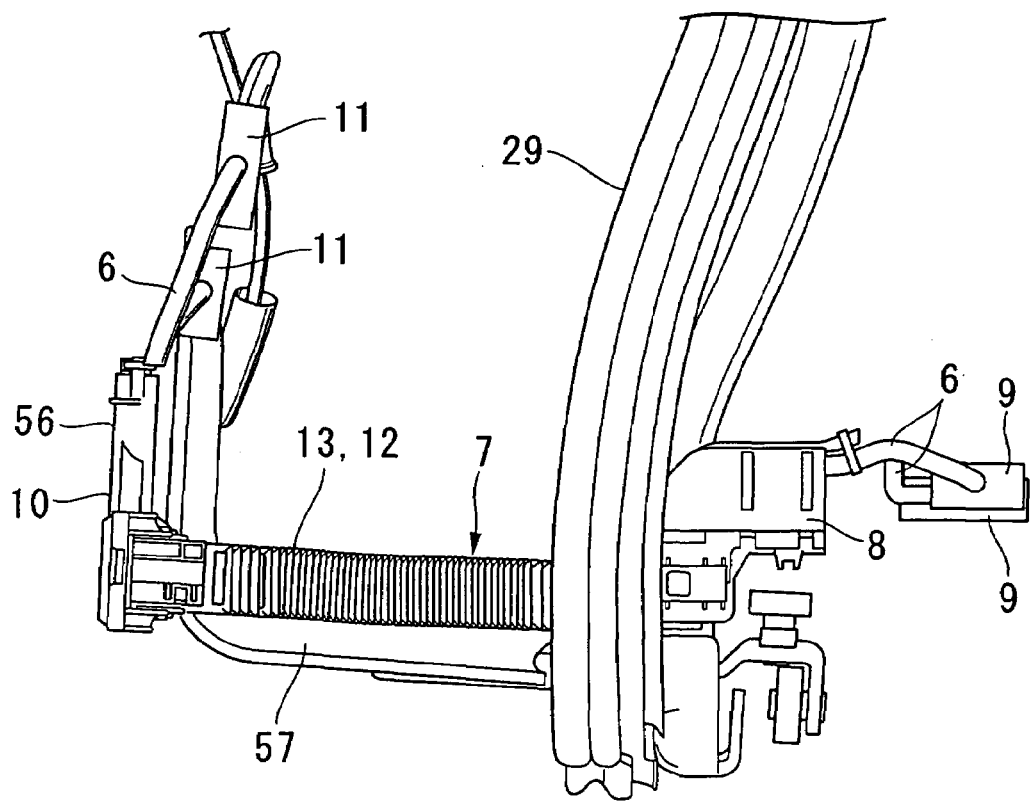
Figure 21A:
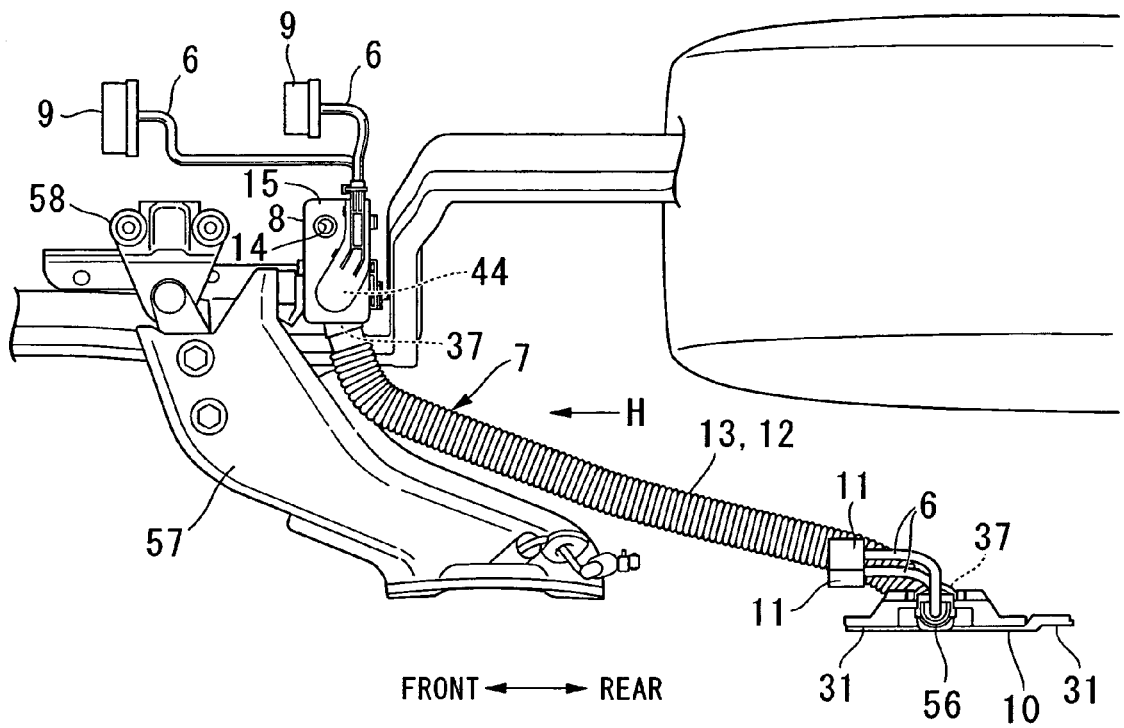
FIG. 21A and FIG. 21B show the sliding door of the embodiment of the present invention at a completely open position, where
Figure 21B:
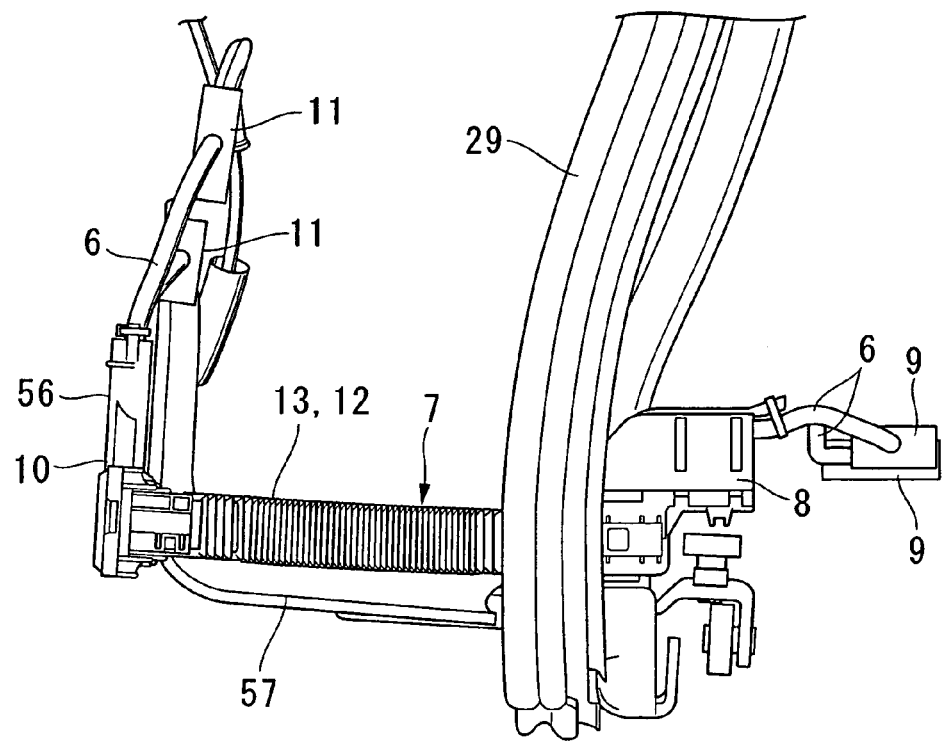

FIG. 19A and FIG. 19B show the completely closed position of the sliding door, where FIG. 19A is a perspective view along the arrow E in FIG. 2 and FIG. 19B is a perspective view along the arrow F in FIG. 2. FIG. 20A and FIG. 20B show the intermediate position of the sliding door, where FIG. 20A is a perspective view along the arrow E in FIG. 2 and FIG. 20B is a perspective view along arrow G in FIG. 20A. FIG. 21A and FIG. 21B show the completely opened position of the sliding door, where FIG. 21A is a perspective view along the arrow E in FIG. 2 and FIG. 21B is a perspective view along the arrow H in FIG. 21A. Note that in FIGS. 20A and 20B and FIGS. 21A and 21B, reference numeral 57 denotes a lower arm that supports the sliding door 5 and reference numeral 50 denotes a roller.

First, as shown in FIG. 19A and FIG. 19B, at the completely closed position of the sliding door 5, the rotating end 37 of the first installation portion 8 faces the front side of the vehicle body, and at the second installation portion 10, the rotating end 37 faces the back end of the vehicle body 1. The harness guide 12 acquires a rectilinear profile so as to join the first installation portion 8 and the second installation portion 10 by the shortest distance. Therefore, the dimension of the projection of each rotating end 37 of the first installation portion 8 and the second installation portion 10 outside the passenger compartment is held to a minimum. In this state, as shown in FIG. 19A, at the first installation portion 8, the harnesses 6 are routed downward after being inserted into the torsion-permitting portion 44 from the inside the passenger compartment towards the outside of the passenger compartment, and then routed into the harness guide 12 towards the front of the vehicle body. In addition, as shown in FIG. 19B, at the second installation portion 10, the harnesses 6, which have been routed from the front side towards the back side of the vehicle body, are inserted into the torsion-permitting portion 56, guided downward, and subsequently routed into the harness guide 12 towards the back side of the vehicle body.

From this state, when the sliding door 5 is opened and reaches the intermediate position 5 shown in FIG. 20A and FIG. 20B, at the first installation portion 8, the rotating end 37 remains facing towards the front side of the vehicle body 1 while the flexible harness guide 12 bends along with the boot 13 following the motion of the sliding door 5, and at the second installation portion 10, the rotating end 37 rotates so as to face towards the front side of the vehicle body 1.

Therefore, at the second installation portion 10, as shown in FIG. 20A, the harnesses 6 twist in the counter-clockwise direction in the torsion-permitting portion 56. However, because the torsion-permitting portion 56 has a torsion range T2, the amount of the twisting of the harnesses 6 per unit length in the height direction becomes small, and the harnesses 6 are not damaged due to the twisting. In addition, because burrs and parting lines do not occur on the inner circumferential surface of the torsion-permitting portion 56 or in the through hole 40 of the rotating end 37, the harnesses 6 are not damaged.

Next, the sliding door 5 is opened farther, and at the completely opened position of the sliding door 5 shown in FIG. 21A and 21B, the rotating end 37 of the second installation portion 10 remains facing towards the front side of the vehicle body 1, while the flexible harness guide 12 changes profile along with the boot 13 from a curved shape to a rectilinear shape. Accompanying this, at the first installation portion 8, the rotating end 37 rotates so as to face towards the back side of the vehicle body 1 at an incline.

Therefore, in FIG. 21A, at the first installation portion 8, the harnesses 6 twist counterclockwise in the torsion-permitting portion 44. However, because the torsion-permitting portion 44 has a torsion range T1, the amount of the twisting of the harnesses 6 per unit length in the height direction becomes small, and there is no damage to the harnesses 6 due to the twisting. In addition, because burrs and parting lines do not occur on the inner surface of the guide walls 42 or the inclining wall 43 of the torsion-permitting portion 44, in the inner circumferential surface of the through hole 41 or in the through hole 40 of the rotating end 37, there is no damage to the harnesses 6.

Therefore, according to the embodiment described above, it is possible to permit the rotation of the harnesses 6 at the end portions of the harness guide 12 due to the torsion-permitting portions 44 and 56 for the harnesses 6 respectively of the first installation portion 8 and the second installation portion 10, it is possible to improve the degree of freedom of the routing configuration of the harnesses 6 and the harness guide 12, and it is possible to implement space saving.

In addition, it is possible to improve the degree of freedom of the routing configuration of the harnesses 6 over the entire harness guide 12 due to the torsion-permitting portions 44 and 56 respectively of the first installation portion 8 and the second installation portion 10 provided on the ends of the harness guide 12. In addition, it is possible to convert the rotational movement of the rotating end 37 produced by the motion of the sliding door 5 in the horizontal direction at the end of the harness guide 12 to the twisting action of the harnesses 6 very efficiently due to the torsion-permitting portions 44 and 56. Here, when forming the torsion-permitting portions 44 and 56, because the direction of die extraction is set to a direction along the harnesses 6, it is possible to prevent burrs and parting lines from occurring in the harness insertion holes of the torsion-permitting portions 44 and 56 during molding, and as a result, it is possible to prevent damage to the harnesses 6, and thereby it is possible to improve the durability of the harnesses 6.

By providing the torsion-permitting portions 44 and 56 for the harnesses 6 in the first installation portion 8 and the second installation portion 10 along with the rotating end 37 in this manner, it becomes unnecessary to ensure a large routing area for the harness guide 12, and then when the sliding door 5 is completely opened or completely closed, it is possible to set the harnesses 6 rectilinearly along the longitudinal direction of the vehicle body. Thereby, the layout of the harness routing becomes simple, and thus the projection dimensions in the transverse direction of the vehicle while the sliding door is open can be reduced to a minimum. It then becomes possible to shorten the length of the arms that support the sliding door 5 on the vehicle body 1, which contributes to making the vehicle lightweight.

Note that the invention is not limited by the embodiments described above, and for example, either the first installation portion 8 or the second installation portion 10 can be omitted, and twisting of the harnesses 6 may be permitted only at a torsion-permitting portion on one side.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A harness routing structure for a sliding door, comprising:
  harnesses that are routed between a vehicle body and a sliding door; and
  a guiding device that is provided along the harnesses and that guides the harnesses, wherein
  the guiding device has at the ends thereof installation portions that are respectively installed on the vehicle body and the sliding door, and
  a torsion-permitting portion for permitting twisting of the harnesses is provided along the harnesses in the installation portions.

2. The harness routing structure according to claim 1, wherein the guiding device comprises at one end a first installation portion installed on the vehicle body and at the other end a second installation portion installed on the sliding door.

3. The harness routing structure according to claim 1, wherein the torsion-permitting portion is formed in a vertical direction.

4. The harness routing structure according to claim 1, wherein the torsion-permitting portion is molded by dies in such a manner that an extraction direction of the dies is set along the harnesses.

* * * * *